United States Patent
Kimura

(10) Patent No.: US 8,422,425 B2
(45) Date of Patent: Apr. 16, 2013

(54) TERMINAL DEVICE AND BASE STATION DEVICE

(75) Inventor: Dai Kimura, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 277 days.

(21) Appl. No.: 12/791,455

(22) Filed: Jun. 1, 2010

(65) Prior Publication Data

US 2010/0309865 A1 Dec. 9, 2010

(30) Foreign Application Priority Data

Jun. 5, 2009 (JP) .................. 2009-136714

(51) Int. Cl.
*H04W 4/00* (2009.01)

(52) U.S. Cl.
USPC .......................... 370/328; 370/338

(58) Field of Classification Search ............. 370/328, 370/329, 338

See application file for complete search history.

(56) References Cited

U.S. PATENT DOCUMENTS

| | | | | |
|---|---|---|---|---|
| 7,480,269 | B2 * | 1/2009 | Heo et al. ....................... | 370/328 |
| 7,773,557 | B2 * | 8/2010 | Grant et al. .................... | 370/328 |
| 7,778,217 | B2 * | 8/2010 | Lee et al. ....................... | 370/328 |
| 2005/0169391 | A1 | 8/2005 | Takeda et al. .................. | 375/259 |
| 2009/0285164 | A1 * | 11/2009 | Chin et al. ..................... | 370/329 |
| 2010/0177649 | A1 * | 7/2010 | Ishii et al. ...................... | 370/252 |
| 2012/0134337 | A1 | 5/2012 | Aiba et al. | |
| 2012/0147778 | A1 | 6/2012 | Ishii et al. | |
| 2012/0147980 | A1 | 6/2012 | Nakao et al. | |

FOREIGN PATENT DOCUMENTS

| | | |
|---|---|---|
| EP | 1 513 272 | 3/2005 |
| EP | 2 117 246 | 11/2009 |
| EP | 2 124 368 | 11/2009 |
| EP | 2 129 139 | 12/2009 |
| EP | 2 129 156 | 12/2009 |
| EP | 2 129 157 | 12/2009 |
| JP | 63-172535 | 7/1988 |
| JP | 2008-193648 | 8/2008 |
| JP | 2008-530849 | 8/2008 |
| WO | 2006/083139 | 8/2006 |
| WO | 2008/105316 | 9/2008 |

(Continued)

OTHER PUBLICATIONS

Extended European Search Report with Annex To The Extended European Search Report for corresponding European Patent Application No. 10164880.6, mailed Apr. 6, 2011.

(Continued)

*Primary Examiner* — Warner Wong
(74) *Attorney, Agent, or Firm* — Myers Wolin, LLC

(57) ABSTRACT

A base station measures a signal to interference power ratio using a control signal received from a terminal device through wireless communication, and decides an MCS value indicating a combination of a modulation scheme and a channel code rate. The base station includes the decided MCS value in uplink-channel transmission information and transmits the MCS value to the terminal device by using a control channel including downlink scheduling information. The terminal device decides a transmission format of an uplink data channel based on the MCS in the uplink-channel transmission information. The terminal device, when having received a downlink data channel from the base station, decides a response content (ACK/NACK/DTX) to the base station, based on the result of decoding the downlink data channel. Thereafter, the terminal device transmits the decided response content to the base station through the uplink data channel using the decided transmission format.

10 Claims, 10 Drawing Sheets

FOREIGN PATENT DOCUMENTS

| WO | 2008/105420 | 9/2008 |
|----|-------------|--------|
| WO | 2008/108224 | 9/2008 |
| WO | 2008/114662 | 9/2008 |
| WO | 2008/120544 | 10/2008 |
| WO | 2009/008337 | 1/2009 |
| WO | 2009/057285 | 5/2009 |

OTHER PUBLICATIONS

Teppei Oyama et al.; "Field Experiment Results Using 2×2 and 4×4 MIMO Precoding in E-UTRA Downlink"; APCC 2009, 15th ASIA-PACIFIC CONFERENCE ON, IEEE Piscataway, NJ, USA, Oct. 8, 2009; [Ref.: EESR mailed Apr. 6, 2011].

Daisuke Nishikawa et al; "Investigation on Optimum Control Interval for Intra-cell Fractional TPC Using AMC for Shared Channel in Evolved UTRA Uplink"; IEEE International Symposium on IEEE, Piscataway, NJ USA, Oct. 21, 2008; [Ref.: EESR mailed Apr. 6, 2011].

3rd Generation Partnership Project (3GPP);Technical Specification Group Radio Access Network; "Evolved Universal Terrestrial Radio Access (E-UTRA); Multiplexing and Channel coding"; (Release 8); vol. 36.212, No. V8.4.0, Sep. 16, 2008; pp. 1-56; Chapter 5.2.2, chapter 5.3.3 onwards.

Communication & Partial European Search Report and written opinion, issued by the European Patent Office for corresponding European Patent Application No. 10164880.6, mailed Nov. 29, 2010.

3GPP TS 36.212 V8.4.0 (2008-09); 3rd Generation Partnership Project; Technical Specification Group Radio Access network; "Evolved Universal Terrestrial Radio Access (E-UTRA); Multiplexing and channel coding"; (Release 8); Dated Sep. 2008; Chapter 5.2.2 (pp. 20-31). [URL: http://www.3gpp.org/ftp/Specs/html-info/36212.htm].

3GPP TSG Ran WG1 meeting #50bis; Agenda Item: 6.2.4; Source: Nokia Siemens Networks, Nokia; Title: "Avoiding PUSCH error situations caused by DL allocation grant signalling failure"; Document for: Discussion; R1-074331; Oct. 8-12, Shanghai, China; (pp. 1-4). [URL: http://www.3gpp1.com/ftp/tsg_ran/WG1_RL/TSGR1_50b/Docs/].

Notice of Rejection issued for corresponding Japanese Patent Application No. 2009-136714, mailed on Feb. 19, 2013 with English translation.

Samsung; "ACK/NAK DTX Detection in PUSCH"; Agenda Item: 6.1.4; 3GPP TSG RAN WG1 #51bis; R1-080031; Sevilla, Spain; Jan. 14-18, 2008.

* cited by examiner

FIG.3

|  | (a) MCS SMALL: FORMAT #1 | (b) MCS LARGE: FORMAT #2 |
|---|---|---|
| (1) WHEN ACK/NACK IS NOT TRANSMITTED UL GRANT | DATA | DATA / NOT TRANSMITTED |
| (2) WHEN ACK/NACK IS TRANSMITTED UL GRANT + DL SCHEDULING INFO. | DATA / ACK/NACK | DATA / ACK/NACK |

FIG.4

| MCS | MODULATION | TBS | CODE RATE |
|---|---|---|---|
| 0 | QPSK | 32 | 0.056 |
| 1 | QPSK | 56 | 0.097 |
| 2 | QPSK | 72 | 0.125 |
| 3 | QPSK | 104 | 0.181 |
| 4 | QPSK | 120 | 0.208 |
| 5 | QPSK | 144 | 0.25 |
| 6 | QPSK | 176 | 0.306 |
| 7 | QPSK | 224 | 0.389 |
| 8 | QPSK | 256 | 0.444 |
| 9 | QPSK | 296 | 0.514 |
| 10 | QPSK | 328 | 0.569 |
| 11 | 16QAM | 328 | 0.285 |
| 12 | 16QAM | 376 | 0.326 |
| 13 | 16QAM | 440 | 0.382 |
| 14 | 16QAM | 488 | 0.424 |
| 15 | 16QAM | 552 | 0.479 |
| 16 | 16QAM | 600 | 0.521 |
| 17 | 16QAM | 632 | 0.549 |
| 18 | 16QAM | 696 | 0.604 |
| 19 | 16QAM | 776 | 0.674 |
| 20 | 16QAM | 840 | 0.729 |
| 21 | 64QAM | 840 | 0.486 |
| 22 | 64QAM | 904 | 0.523 |
| 23 | 64QAM | 1000 | 0.579 |
| 24 | 64QAM | 1064 | 0.616 |
| 25 | 64QAM | 1128 | 0.653 |
| 26 | 64QAM | 1192 | 0.69 |
| 27 | 64QAM | 1256 | 0.727 |
| 28 | 64QAM | 1480 | 0.856 |

FIG.8

| NUMBER OF RBs | MCS | |
|---|---|---|
| | 0 TO 10 | 11 TO 28 |
| 1 TO 10 | FORMAT #1 | FORMAT #2 |
| 11 OR MORE | FORMAT #1 | |

FIG.9

| MIMO | NUMBER OF RBs | MCS | |
|---|---|---|---|
| | | 0 TO 10 | 11 TO 28 |
| APPLIED | - | FORMAT #2 | |
| NOT APPLIED | 1 TO 10 | FORMAT #1 | FORMAT #2 |
| | 11 OR MORE | FORMAT #1 | |

TERMINAL DEVICE AND BASE STATION DEVICE

CROSS-REFERENCE TO RELATED APPLICATION

This application is based upon and claims the benefit of priority of the prior Japanese Patent Application No. 2009-136714, filed on Jun. 5, 2009, the entire contents of which are incorporated herein by reference.

FIELD

The embodiments discussed herein are directed to a terminal device and a base station device which perform wireless communication.

BACKGROUND

Recently, HSDPA (High Speed Downlink Packet Access) or the like capable of increasing a packet transmission speed in a downlink (from base station to terminal) direction of about 384 kbps to 2 Mbps up to 14.4 Mbps at maximum is used for communication of a mobile station such as a mobile terminal.

The HSDPA automatically selects suitable modulation scheme and coding scheme according to a radio wave condition. For example, if the radio wave condition is bad, QPSK (Quadrature Phase Shift Keying) with high stability but low bit-rate is used, while if the radio wave condition is good, modulation is performed by using higher-bit-rate 16QAM (16 Quadrature Amplitude Modulation).

Furthermore, the HSDPA changes an error correction method in such a manner that when the radio wave condition is bad, a low-code-rate coding scheme with a high error correction capability is used, and that when the radio wave condition is good, then a high-code-rate coding scheme with a low error correction capability is used. Moreover, as a retransmission control method, the HSDPA adopts an HARQ (Hybrid Automatic Repeat Request) scheme to suppress the number of retransmissions upon detection of an error.

Here, a general operation of downlink HARQ will be explained by exemplifying LTE (Long Term Evolution) as a next-generation mobile phone system. First, a base station transmits a control channel (PDCCH) including downlink scheduling information (DL Scheduling Information) and a downlink data channel (PDSCH) including downlink transmission data.

At this time, a terminal receives the downlink data channel according to the scheduling information, and notifies the base station of ACK (success of reception) being a transmission acknowledgement signal ACK (acknowledgement) or NACK (failure of reception) using an uplink channel based on a result of Cyclic Redundancy Check (CRC). The base station, when receiving the ACK, stops HARQ, and retransmits data (transmits error correction bits different from the initially transmitted data) when receiving the NACK. Then, the terminal combines the initially received data with the retransmitted error correction bits, so that an error correction capability can be improved. If there is no error, then the data is transmitted at one time, while if there is an error, then the error can be corrected with a less number of data retransmissions. Therefore, the terminal can increase an average throughput.

However, if reception of PDCCH fails, the terminal cannot recognize transmission of PDSCH and cannot perform a reception process of PDSCH, and therefore, transmission of ACK/NACK is not performed. More specifically, when receiving ACK/NACK from the terminal, the base station needs to perform three-value determination including DTX being a state in which the terminal fails to receive PDCCH including "DL Scheduling Information" and does not transmit ACK/NACK, in addition to two-value determination of ACK/NACK.

In the uplink data communication, the base station transmits uplink-channel transmission information (UL Grant) to the terminal using PDCCH, and the terminal transmits uplink data channel (PUSCH) including uplink transmission data to the base station based on the information. But when a timing of transmitting ACK/NACK and a timing of transmitting the uplink data channel (PUSCH) coincide with each other, the terminal needs to simultaneously transmit ACK/NACK and PUSCH to the base station. However, the uplink data signal PUSCH in LTE uplink is transmitted on a single carrier in order to realize a low PAPR (Peak to Average Power Ratio). Therefore, the simultaneous transmission of ACK/NACK and PUSCH in a multiplexing manner on a frequency axis causes an increase in PAPR. Thus, the terminal needs to temporally multiplex ACK/NACK and uplink data on a data signal inside the PUSCH and transmit the data.

From the above, for example, in LTE, ACK/NACK is overwritten in the data signal of PUSCH and is transmitted. More specifically, as represented in FIG. 12, the terminal creates uplink data according to the uplink-channel transmission information (UL Grant), and when there is ACK/NACK information to be transmitted, part of the data is overwritten with ACK/NACK symbol and transmitted. At this time, if the number of symbols for ACK/NACK is increased, then a code rate of ACK/NACK bits becomes smaller, so that receiving characteristic is improved. Therefore, in LTE, the number of symbols used for ACK/NACK transmission is changed according to MCS (Modulation and Coding Scheme) specified by "UL Grant". More specifically, to keep constant the reception quality of ACK/NACK, if the MCS is large, the reception quality is good, and therefore the number of symbols for ACK/NACK is decreased, and if the MCS is small, the reception quality is bad, and therefore the number of symbols for ACK/NACK is increased.

Furthermore, there is also used a technology for always ensuring symbols for ACK/NACK transmission. More specifically, as represented in FIG. 13, a time domain for transmitting data is always limited regardless of whether ACK/NACK is transmitted. In this case also, the number of symbols is usually changed by MCS.

Such conventional technologies are disclosed in for example "http://www.3gpp.org/ftp/Specs/html-info/36212.htm", 3GPP TS36.212 V8.4.0 Chapter 5.2.2, and "http://www.3gpp1.com/ftp/tsg_ran/WG1_RL1/TSGR1_50b/Docs/", 3GPP R1-074331.

However, the conventional technology has a problem that there is a trade-off between data transmission efficiency and ACK/NACK determination accuracy, and that high ACK/NACK determination accuracy cannot be ensured without a decrease in efficiency.

More specifically, in the case of the conventional technology as represented in FIG. 12, a transmission side (e.g., terminal), when ACK/NACK is not transmitted because of failure of reception of PDCCH, enters data for PUSCH into a portion of which ACK/NACK is supposed to be transmitted, and transmits the data. Therefore, in a reception side (e.g., base station), because values of bits in ordinary data are usually randomly different from bits of ACK/NACK after being coded, it is possible to perform three-value determination of ACK/NACK/DTX using the randomness. However, if the number of symbols for which ACK/NACK are multiplexed is large enough, then satisfactory determination accuracy of the three-value determination can be obtained. Meanwhile, if the number of symbols is small, then there arises a problem that the determination accuracy is largely degraded even if an SNR (Signal to Noise Ratio) is large.

In the case of the conventional technology as represented in FIG. 13, the transmission side (e.g., terminal) always ensures symbols for ACK/NACK transmission, and thus can ensure satisfactory determination accuracy if the SNR is large even if the number of symbols is small. Meanwhile, if there are a large number of symbols in particular, then there arises a problem that the number of symbols for PUSCH is always largely reduced and this causes low use efficiency of uplink resources.

SUMMARY

According to an aspect of an embodiment of the invention, a terminal device includes a format deciding unit that decides a transmission format of an uplink data channel to be transmitted to a base station device based on uplink-channel transmission information received from the base station device; a response deciding unit that decides a response content to the base station device when a downlink data channel is received from the base station device, based on a result of decoding the downlink data channel; and a response transmitting unit that transmits the response content decided by the response deciding unit to the base station device through the uplink data channel using the transmission format decided by the format deciding unit.

According to another aspect of an embodiment of the invention, a base station device includes a measuring unit that measures a signal to interference power ratio using a control signal received from a terminal device through wireless communication; a deciding unit that decides a Modulation and Coding Scheme (MCS) value indicating a combination of a modulation scheme and a channel code rate based on the signal to interference power ratio measured by the measuring unit; and an MCS transmitting unit that includes the MCS value decided by the deciding unit in uplink-channel transmission information and transmits the MCS value to the terminal device using a control channel including downlink scheduling information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram of format examples of an uplink data channel;

FIG. 4 is a diagram of examples of information stored in a modulation scheme DB;

FIG. 8 is a diagram of an example of how to select a format in consideration of the number of RBs;

FIG. 9 is a diagram of an example of how to select a format in consideration of whether MIMO is applied;

DESCRIPTION OF EMBODIMENTS

Preferred embodiments of the present invention will be explained with reference to accompanying drawings.

It should be noted that the present invention is not limited by the embodiments.

[a] First Embodiment

Overall Configuration of Communication System

Figure 1:
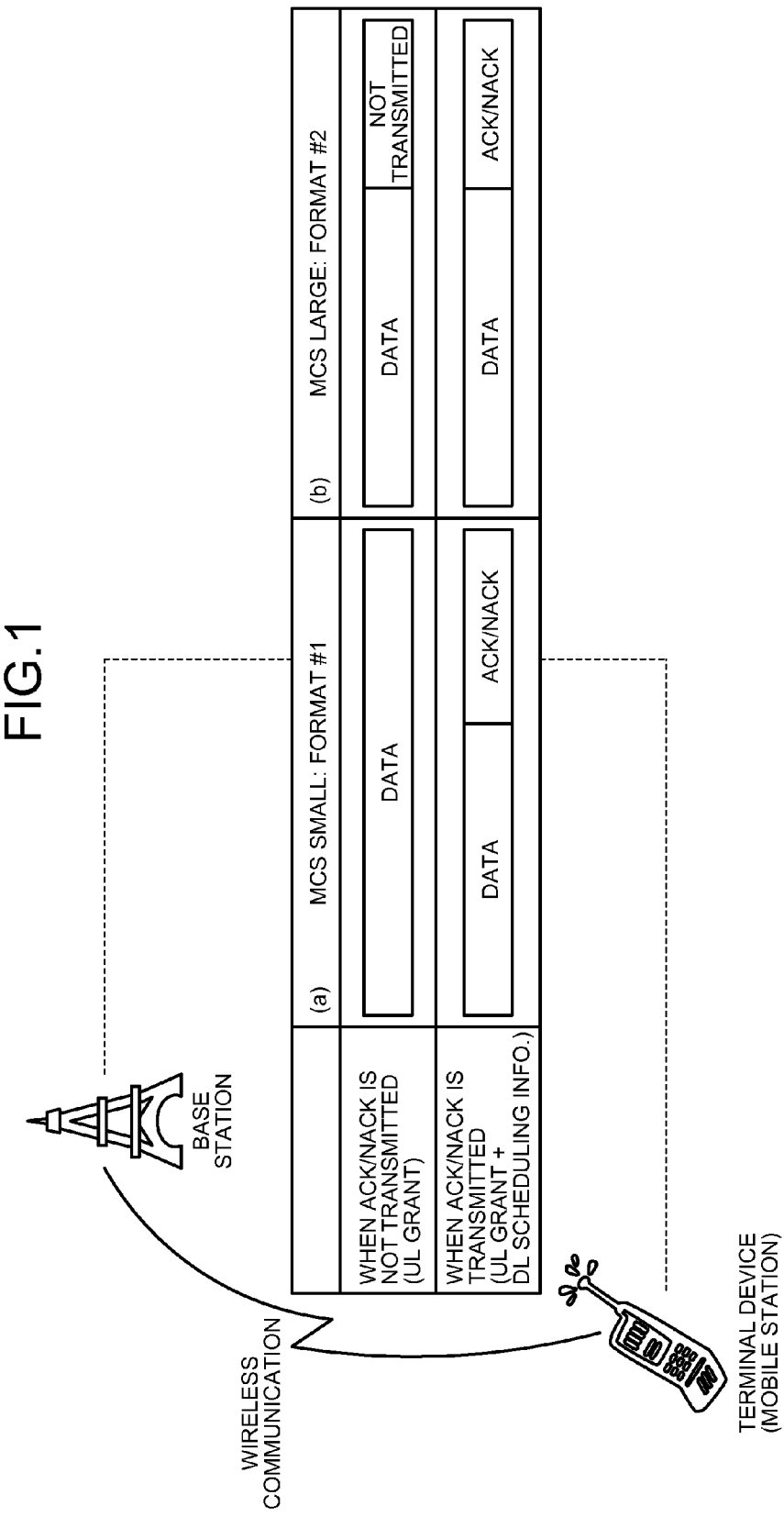
FIG. 1 is a schematic for explaining an overall configuration of a communication system according to a first embodiment.

First, an overall configuration of a communication system including the terminal device and the base station disclosed in the present application will be explained with reference to FIG. 1. FIG. 1 is a schematic for explaining the overall configuration of a communication system according to a first embodiment.

As represented in FIG. 1, the communication system includes a base station being a server device that directly communicates with a terminal device (mobile station) through wireless communication, and a mobile station being a terminal device that is connected to the base station through the wireless communication and can use various communication services such as voice communication and data communication.

It should be noted that one base station and one mobile station are illustrated here, however, the number of connected devices is not limited thereto. Moreover, a case where the mobile station is used as the terminal device will be explained herein, however, it is possible to use various terminal devices such as a personal computer, a home-use game machine, an Internet TV, a PDA, or a mobile communication terminal such as a mobile phone and a PHS.

Furthermore, the base station and the mobile station perform communication using LTE which is higher speed than HSDPA, and this allows high-speed data communication. Moreover, HARQ is implemented in such a manner that data of which normal transmission/reception is failed between the base station and the mobile station is used for its retransmission without disposing the data to suppress data retransmission when an error occurs. As a result, a throughput of a user (mobile station) of which reception condition is bad is improved, so that an average throughput is increased.

As explained above, in the communication system according to the first embodiment, communication is performed using LTE, data retransmission using HARQ is implemented, and high ACK/NACK determination accuracy can be ensured without a decrease in the efficiency.

More specifically, the mobile station in the communication system according to the first embodiment decides a format of an uplink data channel to be transmitted to the base station based on the uplink-channel transmission information received from the base station. The mobile station, when receiving a downlink data channel from the base station, decides a response content to the base station based on the result of decoding the downlink data channel, and transmits the decided response content to the base station through the uplink data channel using the decided format.

For example, the base station in the communication system according to the first embodiment receives an uplink signal to measure an SIR (Signal to Interference power Ratio) of the uplink, from the mobile station, and measures an uplink SIR from the received signal. The base station decides MCS (Modulation and Coding Scheme) based on the measured uplink SIR. Then, the base station transmits the decided MCS included in the uplink-channel transmission information (UL Grant) to the mobile station using the control channel (PD-CCH).

When the MCS added to the uplink-channel transmission information (UL Grant) received from the base station is a small value less than a threshold, a required SNR is small, and thus, the mobile station increases the number of symbols for ACK/NACK, so that it is desirable to increase ACK/NACK determination accuracy. Therefore, the mobile station, when the MCS is small, decides to use a format #1 for overwriting the symbol for transmission of ACK/NACK in Data as represented in (a) of FIG. 1. Meanwhile, in the mobile station, when the MCS included in the uplink-channel transmission information (UL Grant) received from the base station is a large value equal to or more than the threshold, because the SNR is large and the determination accuracy is high, the number of symbols for ACK/NACK may be small. Therefore, when the MCS is large, the mobile station decides to use a format #2 for always ensuring the symbol for transmission of ACK/NACK as represented in (b) of FIG. 1.

Thereafter, the mobile station receives the control channel (PDCCH) including the downlink scheduling information (DL Scheduling Information) from the base station, and receives the downlink data channel (PDSCH) according to the "DL Scheduling Information". The mobile station decodes the received downlink data channel (PDSCH) and performs Cyclic Redundancy Check (CRC) operation. The mobile station decides a response content in such a manner that, when it is determined by the decoding and the CRC result that PDSCH can be successfully received, then the response content is "ACK (success of reception)" and, when it is determined that PDSCH cannot be successfully received, then the response content is "NACK (failure of reception)". If "DL Scheduling Information" cannot be received, then the mobile station decides to respond DTX indicating a state in which ACK/NACK is not transmitted, as the response content.

When it is determined that the format #1 is used, the mobile station overwrites ACK or NACK (in the case of DTX, there is no data as a target for transmission) in a part of Data portion of a data format, and transmits the uplink data channel (PUSCH) including uplink transmission data to the base station. Moreover, when it is decided that the format #2 is used, the mobile station writes ACK or NACK (in the case of DTX, there is no data as a target for transmission) to a predetermined area of the previously ensured data format, and transmits the uplink data channel (PUSCH) to the base station.

Thereafter, the base station, when receiving the uplink data channel (PUSCH) from the mobile station, implements the three-value determination of ACK/NACK/DTX using a method based on the MCS transmitted to the mobile station, and can obtain the result of transmission from the mobile station. More specifically, the base station performs the three-value determination using the symbol pattern for ACK/NACK, because the format #1 with a large number of symbols for ACK/NACK is used when the MCS value less than the threshold (MCS is small) is transmitted to the mobile station. Furthermore, the base station performs the three-value determination using received power in an ACK/NACK area, because the format #2 with a small number of symbols for ACK/NACK is used when the MCS value equal to or more than the threshold (MCS is large) is transmitted to the mobile station. The base station performs a process of stopping HARQ or retransmitting data according to the result of three-value determination.

As explained above, the communication system according to the first embodiment can transmit ACK/NACK/DTX response from the mobile station to the base station in a format suitable for the MCS specified by the uplink-channel transmission information (UL Grant). As a result, it is possible to ensure high ACK/NACK determination accuracy without a decrease in the transmission efficiency of data signals.

Configuration of Communication System

Next, the configuration of the communication system represented in FIG. 1 will be explained with reference to FIG. 2 to FIG. 5. Here, the configuration of the mobile station will be explained first, and then the configuration of the base station will be explained.

Configuration of Mobile Station

Figure 2:
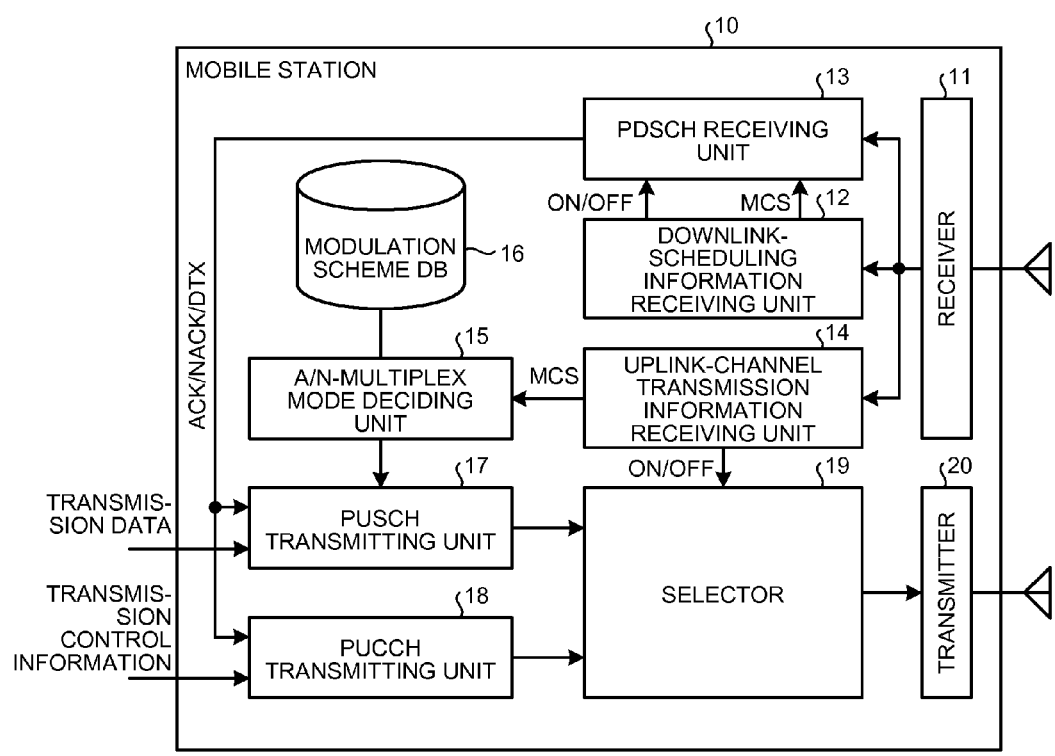
FIG. 2 is a block diagram of a configuration of a mobile station.

First, the configuration of the mobile station in the communication system according to the first embodiment will be explained with reference to FIG. 2. FIG. 2 is a block diagram of the configuration of the mobile station. As represented in FIG. 2, a mobile station 10 includes a receiver 11, a downlink-scheduling information receiving unit 12, a PDSCH receiving unit 13, and an uplink-channel transmission information receiving unit 14. The mobile station 10 also includes an A/N-multiplex mode deciding unit 15, a modulation scheme DB 16, a PUSCH transmitting unit 17, a PUCCH transmitting unit 18, a selector 19, and a transmitter 20.

The receiver 11 is connected to each of the downlink-scheduling information receiving unit 12, the PDSCH receiving unit 13, and the uplink-channel transmission information receiving unit 14. The receiver 11 receives various information and data transmitted from the base station and also receives various information. More specifically, the receiver 11 receives control channel (PDCCH) including downlink scheduling information (DL Scheduling Info.) from the base station, and receives the downlink data channel (PDSCH) including downlink transmission data from the base station. The receiver 11 also receives uplink-channel transmission information (UL Grant) including MCS from the base station.

The downlink-scheduling information receiving unit 12 receives the control channel (PDCCH) including the downlink scheduling information (DL Scheduling Info.) from the base station through the receiver 11. The downlink-scheduling information receiving unit 12 outputs the "DL scheduling info." such as a bandwidth to be allocated (number of resource blocks (hereinafter, also called "number of RBs"); wireless resource) to the PDSCH receiving unit 13. Moreover, when the control channel (PDCCH) can be received from the base station, the downlink-scheduling information receiving unit 12 instructs the PDSCH receiving unit 13 to receive the downlink data channel (PDSCH) (ON notification). On the other hand, when the control channel (PDCCH) cannot be received from the base station, the downlink-scheduling information receiving unit 12 instructs the PDSCH receiving unit 13 about the effect (OFF notification). Furthermore, the downlink-scheduling information receiving unit 12 acquires MCS which is currently used from the received PDSCH and outputs the MCS to the PDSCH receiving unit 13.

It should be noted that the downlink-scheduling information receiving unit 12 receives the control channel (PDCCH) to receive the uplink-channel transmission information (UL Grant) including the MCS decided by the base station from the base station, and outputs the result of this to the uplink-channel transmission information receiving unit 14.

When receiving the downlink data channel from the base station, the PDSCH receiving unit 13 decides a response content to the base station based on the result of decoding the downlink data channel. More specifically, the PDSCH receiving unit 13 receives the downlink data channel (PDSCH) from the base station according to the downlink scheduling information (DL Scheduling Information) received by the downlink-scheduling information receiving unit 12 through the receiver 11. The PDSCH receiving unit 13 also, when receiving "ON notification" from the downlink-scheduling information receiving unit 12, receives the PDSCH from the base station using the number of RBs and MCS included in the "DL Scheduling Information".

The PDSCH receiving unit 13 decodes the received PDSCH and performs CRC operation and the like. The PDSCH receiving unit 13, when it is determined by the decoding and the CRC result that the PDSCH can be successfully received, decides "ACK (success of reception)" as a response content, and when it is determined that the PDSCH cannot be successfully received, decides "NACK (failure of reception)" as a response content. Moreover, the PDSCH receiving unit 13, when the "DL Scheduling Info." cannot be received or when "OFF notification" is received from the downlink-scheduling information receiving unit 12, decides to respond DTX.

The uplink-channel transmission information receiving unit 14 receives the uplink-channel transmission information (UL Grant) including the MCS decided by the base station from the base station through the receiver 11. When receiving the PDCCH including "UL Grant", the uplink-channel transmission information receiving unit 14 acquires MCS from the "UL Grant" and outputs the MCS to the A/N-multiplex mode deciding unit 15. Furthermore, the uplink-channel transmission information receiving unit 14 outputs information (ON or OFF) as to whether PUSCH is transmitted, to the selector 19.

The A/N-multiplex mode deciding unit 15 decides a format for an uplink data channel to be transmitted to the base station based on the uplink-channel transmission information received from the base station. More specifically, when the MCS acquired by the uplink-channel transmission information receiving unit 14 is a small value less than a threshold, a required SNR is small, and thus, the A/N-multiplex mode deciding unit 15 increases the number of symbols for ACK/NACK to desirably increase ACK/NACK determination accuracy. Therefore, the A/N-multiplex mode deciding unit 15, when the MCS is small, decides to use the format #1 for overwriting the symbol for transmission of ACK/NACK in Data as represented in (a) of FIG. 3. Meanwhile, in the A/N-multiplex mode deciding unit 15, when the MCS included in the uplink-channel transmission information (UL Grant) received from the base station is a large value equal to or more than the threshold, because the SNR is large and the determination accuracy is high, the number of symbols for ACK/NACK may be small. Therefore, when the MCS is large, the A/N-multiplex mode deciding unit 15 decides to use the format #2 for always ensuring the symbol for transmission of ACK/NACK as represented in (b) of FIG. 3.

Then, the A/N-multiplex mode deciding unit 15 outputs the decided format to the PUSCH transmitting unit 17. It should be noted that the threshold of the MCS can be set according to, for example, a target error rate, or can be arbitrarily set from experimental data or the like. FIG. 3 is a diagram of format examples of the uplink data channel.

Furthermore, the A/N-multiplex mode deciding unit 15 specifies a modulation scheme or the like corresponding to the MCS acquired by the uplink-channel transmission information receiving unit 14 from the modulation scheme DB 16, and performs data communication using the specified modulation scheme. For example, the A/N-multiplex mode deciding unit 15, when the MCS acquired by the uplink-channel transmission information receiving unit 14 is "15", decides "Modulation=16QAM, TBS=552, Code rate=0.479".

The modulation scheme DB 16 is a database, as represented in FIG. 4, that stores therein "MCS, MODULATION, TBS, CODE RATE" in association with one another. The "MCS" stored herein is decided by the base station and indicates the value of MCS acquired by the uplink-channel transmission information receiving unit 14 in the mobile station 10. The "Modulation" indicates a digital modulation scheme that modulates a carrier by giving discontinuous change thereto, including QPSK (Quadrature Phase Shift Keying), 16QAM (16 Quadrature Amplitude Modulation), and 64QAM (64 Quadrature Amplitude Modulation). In addition, the "TBS" is a value indicating a transport block size (number of information bits) between the base station and the mobile station, and the "CODE RATE" indicates a code rate being a ratio of "the number of bits after error correction coding" to "the number of information bits=TBS". FIG. 4 is a diagram of examples of information stored in the modulation scheme DB.

The PUSCH transmitting unit 17 transmits the response content decided by the PDSCH receiving unit 13 to the base station through the uplink data channel using the format decided by the A/N-multiplex mode deciding unit 15. More specifically, the PUSCH transmitting unit 17, when ACK/NACK is responded using the format #1, overwrites ACK or NACK in a part of the Data portion of the data format as represented in (1)-(b) of FIG. 3. Then, the PUSCH transmitting unit 17 transmits the uplink data channel (PUSCH) including the created uplink transmission data to the base station based on the uplink-channel transmission information (UL Grant). The PUSCH transmitting unit 17, when responding DTX using the format #1, has no data to be transmitted. Therefore, as represented in (1)-(a) of FIG. 3, the PUSCH transmitting unit 17 transmits the uplink data channel (PUSCH) including the uplink transmission data in which nothing is overwritten in Data of the data format to the base station based on "UL Grant".

Meanwhile, the PUSCH transmitting unit 17, when responds ACK/NACK using the format #2, writes ACK or NACK to a previously ensured predetermined area of the data format as represented in (2)-(b) of FIG. 3. Then, the PUSCH transmitting unit 17 transmits the uplink data channel (PUSCH) including the created uplink transmission data to the base station based on the uplink-channel transmission information (UL Grant). Furthermore, the PUSCH transmitting unit 17, when responding DTX using the format #2, has no data to be transmitted for DTX. Therefore, as represented in (2)-(a) of FIG. 3, the PUSCH transmitting unit 17 transmits the uplink data channel (PUSCH) including the uplink transmission data in which nothing is written to the previously ensured predetermined area in the data format to the base station based on the "UL Grant".

The PUCCH transmitting unit 18, when there is no uplink data channel (PUSCH) to be transmitted, transmits the response content decided by the PDSCH receiving unit 13 to the base station using PUCCH. The selector 19, when "ON" is notified by the uplink-channel transmission information receiving unit 14, selects data input from the PUSCH transmitting unit 17, and outputs the selected data to the transmitter 20. Moreover, the selector 19, when "OFF" is notified by the uplink-channel transmission information receiving unit 14, selects data input from the PUCCH transmitting unit 18, and outputs the selected data to the transmitter 20. The transmitter 20 transmits the PUSCH or PUCCH selected by the selector 19 to the base station, or transmits other data to the base station.

Configuration of Base Station

Figure 5:
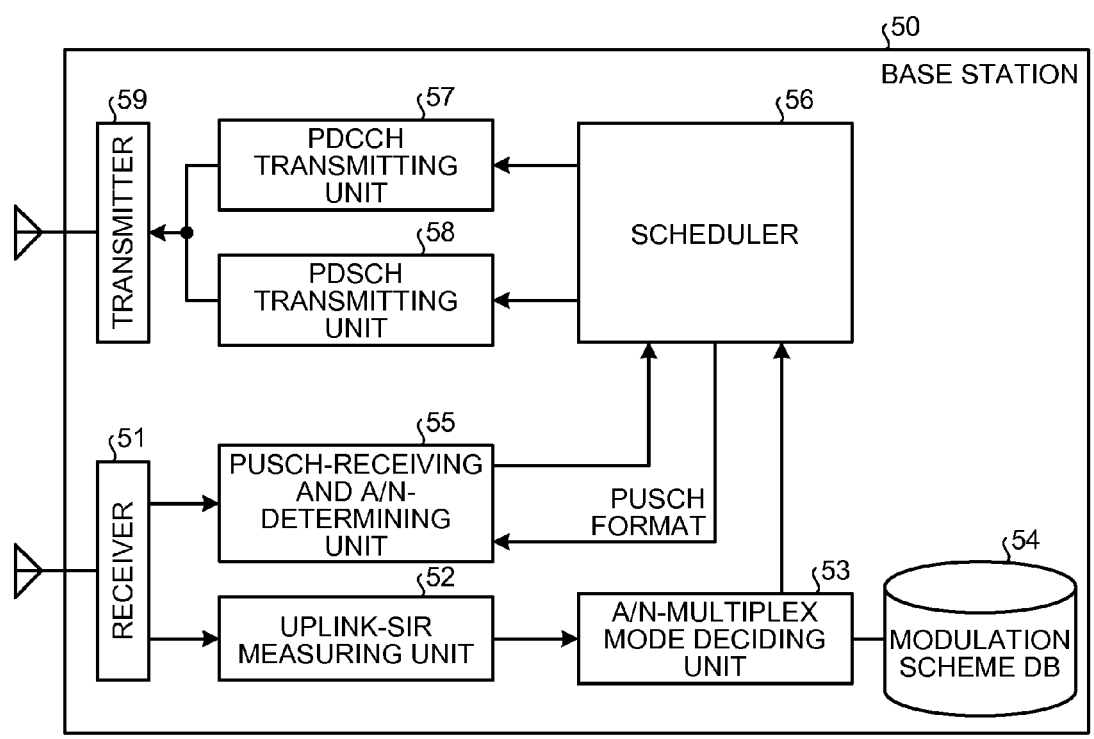
FIG. 5 is a block diagram of a configuration of a base station.

Next, the configuration of the base station in the communication system according to first embodiment will be explained with reference to FIG. 5. FIG. 5 is a block diagram of the configuration of the base station. As represented in FIG. 5, a base station 50 includes a receiver 51, an uplink-SIR measuring unit 52, an A/N-multiplex mode deciding unit 53, a modulation scheme DB 54, a PUSCH-receiving and A/N-determining unit 55, a scheduler 56, a PDCCH transmitting unit 57, a PDSCH transmitting unit 58, and a transmitter 59.

The receiver 51 is connected to the uplink-SIR measuring unit 52 and the PUSCH-receiving and A/N-determining unit 55 or the like. The receiver 51 receives various information and data transmitted from mobile stations. More specifically, the receiver 51 receives the uplink data channel (PUSCH) from the mobile station 10, and receives the uplink signal to measure the uplink SIR from the mobile station 10.

The uplink-SIR measuring unit 52 measures an SIR from the signal or the like received by the receiver 51. More specifically, the uplink-SIR measuring unit 52 measures a signal to interference power ratio (SIR) based on signal power received from the mobile station 10 and interference power received from the mobile station that communicates with other base station. Then, the uplink-SIR measuring unit 52 outputs the result of measurement (SIR value) to the A/N-multiplex mode deciding unit 53.

The A/N-multiplex mode deciding unit 53 decides MCS used for the uplink data channel (PUSCH) based on the SIR measured by the uplink-SIR measuring unit 52. More specifically, the A/N-multiplex mode deciding unit 53 specifies the MCS corresponding to the SIR measured by the uplink-SIR measuring unit 52 from the modulation scheme DB 54, and outputs the MCS to the scheduler 56. It should be noted that the modulation scheme DB 54 is a database in which "SIR" is further associated with "MCS, Modulation, TBS, CODE RATE" represented in FIG. 4.

The PUSCH-receiving and A/N-determining unit 55 receives the uplink data channel (PUSCH) from the mobile station 10 through the receiver 51, and implements three-value determination of ACK/NACK/DTX using a method based on the MCS transmitted to the mobile station. More specifically, the PUSCH-receiving and A/N-determining unit 55, when having transmitted the MCS value less than the threshold (MCS is small) to the mobile station, uses the format #1 with a large number of symbols for ACK/NACK. Therefore, the PUSCH-receiving and A/N-determining unit 55 performs the three-value determination using the symbol pattern for ACK/NACK, and outputs the result to the scheduler 56.

For example, a case where a channel coding method of ACK/NACK is repetition coding in the PUSCH-receiving and A/N-determining unit 55 will be explained below. In this case, if an ACK/NACK series after being demapped is "$r_i$" (where Q' represents the number of symbols of ACK or NACK), the PUSCH-receiving and A/N-determining unit 55 can calculate "S" used for the three-value determination by Expression (1). Here, if the received PUSCH is ACK, then "−1" is added, and if it is NACK, then "+1" is added. Thereafter, the PUSCH-receiving and A/N-determining unit 55 determines "S" calculated by Expression (1) using a determination expression represented by Expression (2), and can thereby determine that the received PUSCH is any one of responses: ACK/NACK/DTX.

$$S = \sum_{i=0}^{Q'-1} r_i (i = 0, 1, \ldots, Q'-1) \quad (1)$$

if $|S| <$ Threshold then $DTX$ else if $S \geq 0$ then $NACK$ else $ACK$ (2)

Furthermore, the PUSCH-receiving and A/N-determining unit 55, when having transmitted the MCS value equal to or more than the threshold (MCS is large) to the mobile station, performs the three-value determination using the received power in an ACK/NACK area because the format #2 with a small number of symbols for ACK/NACK is used, and outputs the value to the scheduler 56.

For example, in the PUSCH-receiving and A/N-determining unit 55, an ACK/NACK series after the symbol portion for ACK/NACK in the PUSCH is demapped is "$r_i$" (where i=0, 1, . . . , Q−1, Q: represents the number of bits of ACK or NACK). Furthermore, if Q' is the number of bits after being coded and the number of symbols $Q_m$ for ACK or NACK is the number of dimensions with a modulation, $Q = Q' \times Q_m$. In the standardization of LTE, if the number of bits of ACK/NACK before being coded is 1, codes in a bit string after being coded for each symbol become ideally as represented in Table (1).

TABLE 1

| QPSK | NACK{1, 1} | ACK{−1, −1} |
|---|---|---|
| 16QAM | NACK{1, 1, −1, −1} | ACK{−1, −1, −1, −1} |
| 64QAM | NACK{1, 1, −1, −1, −1, −1} | ACK{−1, −1, −1, −1, −1,} |

In such a state, the PUSCH-receiving and A/N-determining unit 55 calculates a value to perform two-value determination using first 2 bits in Table 1 using Expression (3). At this time, $Q_m$ is 2 in QPSK, 4 in 16QAM, and 6 in 64QAM. The right side of Expression (3) is a first bit+a second bit.

$$\rho_A = \sum_{i=0}^{Q'-1} r_i Q_m + \sum_{i=0}^{Q'-1} r_i Q_m + 1 \quad (3)$$

As for 16QAM and 64QAM, a value to perform the three-value determination is calculated from Expression (4) using remaining bits. Explanation is briefly made. A value ($\rho_B$) can be calculated by subtracting a value calculated using values of a third bit and subsequent bits other than 2 bits used in the Expression (3) from a value obtained by multiplying a value ($\rho_A$) calculated using the Expression (3) by a predetermined constant ($\alpha$). It is noted that conditions of NACK and ACK become as represented in Expression (5). Furthermore, in the case of QPSK, $\rho_B = \alpha \rho_A$.

$$\rho_B = \alpha \rho_A - \sum_{i=0}^{Q'-1} \sum_{j=2}^{Q_m-1} r_{iQ_m+j} \quad (4)$$

$$\alpha = \begin{cases} 1 & \rho_A \geq 0 \\ -1 & \rho_A < 0 \end{cases} \quad (5)$$

Moreover, the PUSCH-receiving and A/N-determining unit 55 calculates $\rho_{ABS}$ using Expression (6), and can determine that the received PUSCH is any one of ACK/NACK/DTX by substituting $\rho_{ABS}$ and $\rho_A$ calculated by Expression (3) or $\rho_B$ calculated by Expression (4) into a determination expression of Expression (7).

$$\rho_{ABS} = \sum_{i=0}^{Q'-1} \sum_{j=0}^{Q_m-1} |r_{iQ_n+j}| \quad (6)$$

if $\rho_B/\rho_{ABS} <$ Threshold then $DTX$ else if $\rho_A \geq$ 0 then $NACK$ else $ACK$ \quad (7)

The scheduler 56 transmits the control channel (PDCCH), the downlink data channel (PDSCH), and the MCS, and executes various processes related to HARQ. More specifically, the scheduler 56 transmits the PDCCH and PDSCH including the MCS decided by the A/N-multiplex mode deciding unit 53 to the mobile station 10. Furthermore, the scheduler 56, when the result of determination of the PUSCH-receiving and A/N-determining unit 55 is ACK, stops HARQ, and performs retransmission when the result of determination is NACK or DTX.

The PDCCH transmitting unit 57 transmits the control channel (PDCCH) including the downlink scheduling information (DL Scheduling Information) such as a bandwidth to be allocated, to the mobile station 10 according to an instruction operation by the scheduler 56. The PDSCH transmitting unit 58 transmits the uplink-data channel transmission information (UL Grant) to the mobile station using the control channel (PDCCH) and transmits the downlink data channel (PDSCH) including downlink transmission data to the mobile station according to the instruction operation by the scheduler 56.

Processing Flow

Figure 6:
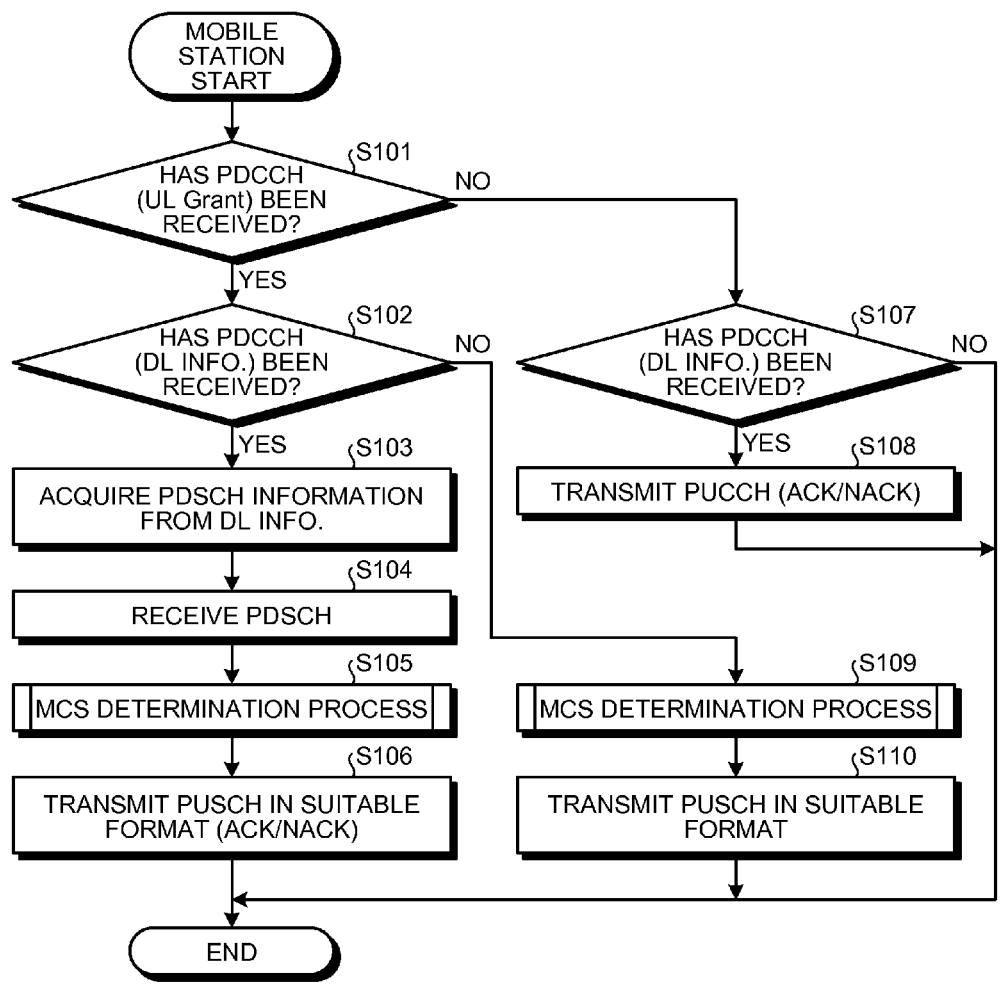
FIG. 6 is a flowchart of a processing flow of the mobile station.
Figure 7:
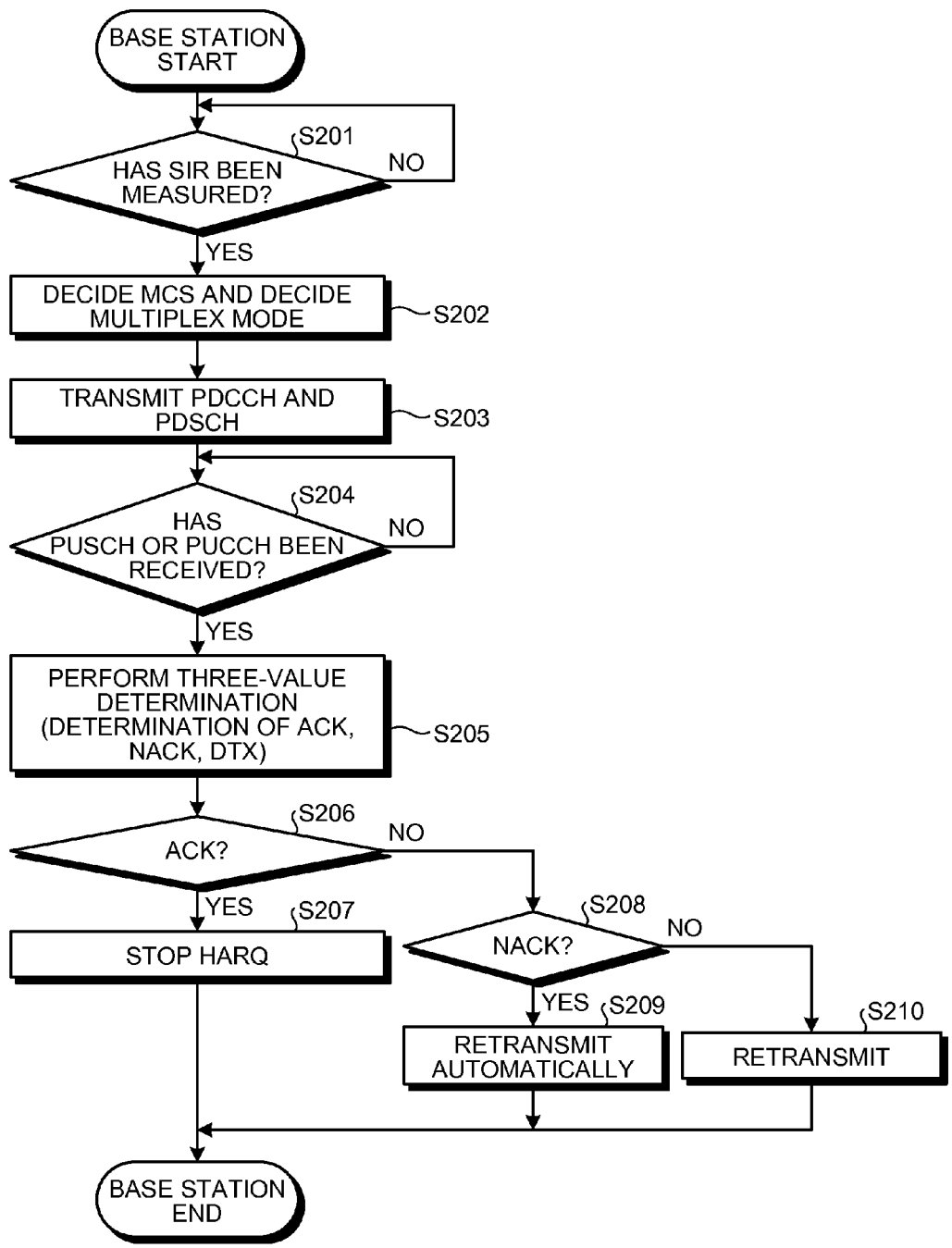
FIG. 7 is a flowchart of a processing flow of the base station.

Next, a flow of communication process according to the first embodiment will be explained with reference to FIG. 6 and FIG. 7. FIG. 6 is a flowchart of a processing flow of the mobile station, and FIG. 7 is a flowchart of a processing flow of the base station.

Processing Flow of Mobile Station

As represented in FIG. 6, the mobile station 10, when having received PDCCH (UL Grant) from the base station 50 (Yes at Step S101), determines whether it has received PDCCH (DL Scheduling Information) from the base station 50 (Step S102).

The mobile station 10, when having received the PDCCH (DL Scheduling Information) from the base station 50 (Yes at Step S102), acquires PDSCH information from the received PDCCH (DL Scheduling Information) (Step S103). Then, the mobile station 10 receives PDSCH according to the acquired PDSCH information (Step S104). At this time, the mobile station 10 performs decoding and CRC operation on the received PDSCH, and creates ACK/NACK.

Subsequently, the mobile station 10 decides a format for transmitting the PUSCH based on the MCS included in the uplink-channel transmission information received from the base station 50 according to the PDCCH (UL Grant) received at Step S101 (Step S105). The mobile station 10 then transmits the PUSCH including an ACK/NACK response using the format decided at Step S105 to the base station 50 (Step S106).

Meanwhile, at Step S101, the mobile station 10, when not having received the PDCCH (UL Grant) from the base station 50 (No at Step S101), determines whether it has received the PDCCH (DL Scheduling Information) from the base station 50 (Step S107).

The mobile station 10, when having received the PDCCH (DL Scheduling Information) from the base station 50 (Yes at Step S107), transmits PUCCH including the ACK/NACK response to the base station 50 (Step S108). The mobile station 10, when not having received the PDCCH (DL Scheduling Information) from the base station 50 (No at Step S107), ends the process.

Referring back to Step S102, the mobile station 10, when not having received the PDCCH (DL Scheduling Information) from the base station 50 (No at Step S102), decides a format for transmitting PUSCH (Step S109). At this time, the mobile station 10 decides the format based on the MCS included in the uplink-channel transmission information received from the base station 50 according to the PDCCH (UL Grant) received at Step S101.

The mobile station 10 transmits the PUSCH to the base station 50 using the format decided at Step S109 (Step S110).

Processing Flow of Base Station

As represented in FIG. 7, the base station 50 measures an SIR from communication with the mobile station 10 (Yes at Step S201), and decides MCS and an A/N multiplex mode (three-value determination mode) based on the result of measurement (Step S202).

The base station 50 then transmits the control channel (PDCCH) including "DL Scheduling Information" to the mobile station 10, and transmits the downlink data channel (PDSCH) or the like including the downlink transmission data to the mobile station 10 using the PDCCH (Step S203). It should be noted that the base station 50 transmits the uplink-data channel transmission information (UL Grant) to the mobile station 10 using PDCCH different from the PDCCH.

Thereafter, the base station 50, when having received the PUSCH or PUCCH from the mobile station 10 (Yes at Step S204), performs three-value determination on the ACK/NACK symbol of the received PUSCH or PUCCH using the A/N multiplex mode (three-value determination mode) decided at Step S202 (Step S205).

When it is determined that the ACK response is included in the received PUSCH or PUCCH (Yes at Step S206), the base station 50 stops HARQ (Step S207). Then, when it is determined that the ACK response is not included in the received PUSCH or PUCCH (No at Step S206), the base station 50 determines whether NACK is included therein (Step S208).

When it is determined that the NACK is included therein (Yes at Step S208), the base station 50 executes automatic retransmission of the PDSCH (Step S209). When it is determined that the received PDSCH is a DTX response (No at Step S208), the base station 50 executes retransmission of the PDCCH (Step S210).

It should be noted that processes explained about the processes of NACK and DTX are only one examples. Therefore, in both of NACK and DTX, the process at Step S209 may be executed.

Effect by First Embodiment

As explained above, according to the first embodiment, the ACK/NACK/DTX response can be transmitted from the mobile station to the base station in a format suitable for MCS specified by the uplink-channel transmission information (UL Grant). As a result, degradation of the determination accuracy can be prevented even if the number of symbols is small, and large reduction in the number of bits of PUSCH may not be performed. Thus, use efficiency of the uplink resources is improved. Therefore, it is possible to ensure high ACK/NACK determination accuracy without a decrease in transmission efficiency of data signals.

[b] Second Embodiment

The first embodiment has explained the example of deciding the format of PDSCH based on the MCS. However, in LTE, because the bandwidth to be allocated (number of RBs) is variable, the format can also be decided in consideration of the number of RBs.

More specifically, if the number of RBs is the threshold (N) or more, the number of symbols for ACK/NACK is set to K or more, and the format #1 for overwriting ACK/NACK in a part of PUSCH is used. Furthermore, if the number of RBs is less than the threshold (N), the format is switch by the MCS. It should be noted that K is decided as the number of symbols with which the three-value determination of the ACK/NACK/DTX can be performed, and N is decided as the number of RBs which causes the overhead of K to be regarded as being small.

For example, as represented in FIG. 8, if the number of RBs is "1 to 10" and the MCS is "0 to 10", then the format #1 for overwriting ACK/NACK in a part of PUSCH is used. If the number of RBs is "1 to 10" and the MCS is "11 to 28", then the format #2 for always ensuring symbols for ACK/NACK transmission is used. In addition, if the number of RBs is "11 or more", then the format #1 for overwriting ACK/NACK in a part of PUSCH is used irrespective of MCS. It should be noted that FIG. 8 is a diagram of an example of how to select a format in consideration of the number of RBs.

By configuring in this manner, the format allowing for the number of RBs can be selected, and thus, even if any value is used as the number of RBs being variable, it is possible to ensure high ACK/NACK determination accuracy without a decrease of transmission efficiency of data signals.

[c] Third Embodiment

The second embodiment has explained the example of deciding the format allowing for the bandwidth to be allocated (number of RBs). Furthermore, the format can be decided according to whether MIMO (Multiple Input Multiple Output) communication is applied.

More specifically, when MIMO is applied, the format #2 for always ensuring symbols for ACK/NACK transmission is used, and when MIMO is not applied, then, similarly to the first embodiment, the format is switched by MCS. That is, because the required SNR is large when the MIMO is applied, the MIMO is not applied for ACK/NACK response. Furthermore, whether the MIMO is applied or not is decided by the scheduler 56 in the base station 50, and it is notified to the mobile station 10 by using "UL Grant".

For example, as represented in FIG. 9, when the MIMO is applied, the format #2 for always ensuring symbols for ACK/NACK transmission is used irrespective of the number of RBs and MCS. Meanwhile, as represented in FIG. 9, if the MIMO is not applied, the number of RBs is "1 to 10", and the MCS is "0 to 10", then the format #1 for overwriting ACK/NACK in a part of PUSCH is used. If the MIMO is not applied, the number of RBs is "1 to 10", and the MCS is "11 to 28", then the format #2 for always ensuring symbols for ACK/NACK transmission is used. Furthermore, if the MIMO is not applied and the number of RBs is "11 or more", then the format #1 for overwriting ACK/NACK in a part of PUSCH is used irrespective of the MCS.

Figure 10:
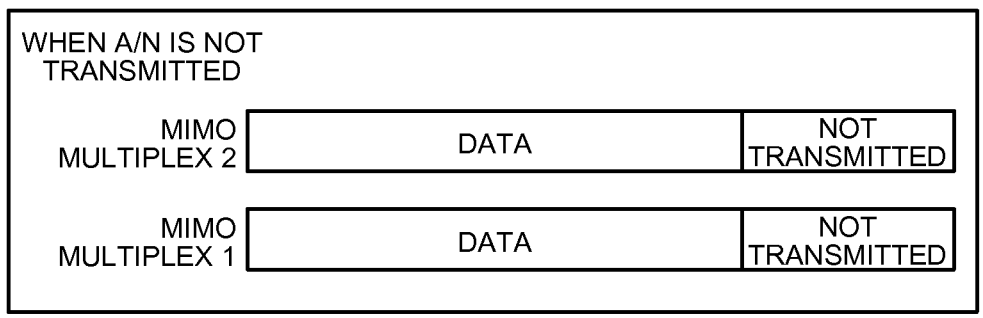
FIG. 10 is a diagram of MIMO multiplexed examples when A/N is not transmitted.
Figure 11:
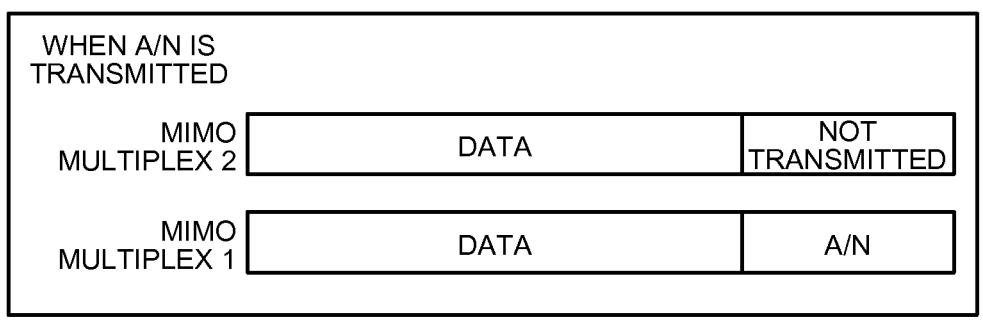
FIG. 11 is a diagram of MIMO multiplexed examples when A/N is transmitted.
Figure 12:
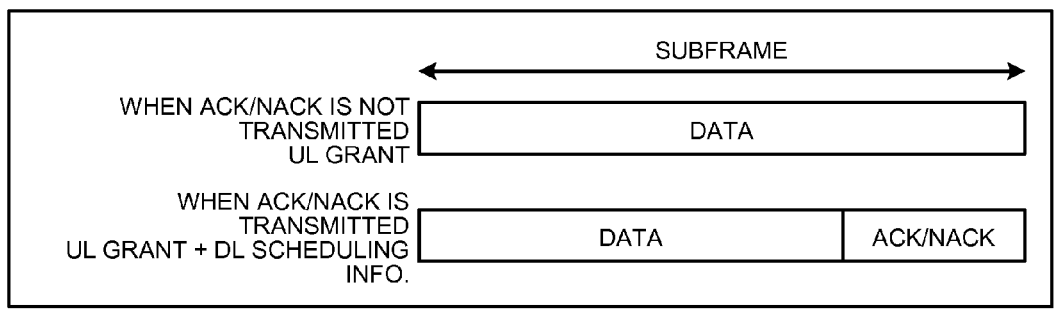
FIG. 12 is a diagram for explaining the conventional technology.
Figure 13:
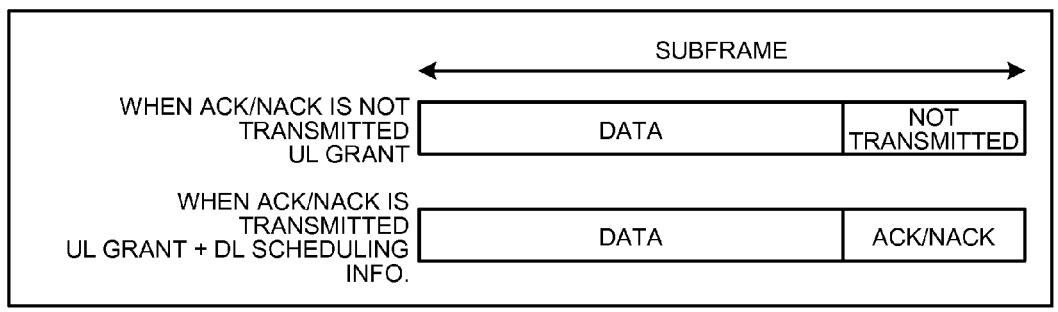
FIG. 13 is a diagram for explaining the conventional technology.

The mobile station 10, when the MIMO is applied to multiplex data and transmit the data at the time of not transmitting ACK/NACK (for example, when DTX is responded), transmits data in which nothing is written to MIMO multiplex 1 and MIMO multiplex 2, as represented in FIG. 10, to the base station 50. Moreover, when the MIMO is applied to multiplex data and transmit the data at the time of transmitting ACK/NACK (for example, ACK or NACK is responded), as represented in FIG. 11, the mobile station 10 transmits data in which an ACK/NACK response is written to the MIMO multiplex 1 but nothing is written to the MIMO multiplex 2, to the base station 50.

MIMO mentioned here represents a wireless communication technology for widening a band of data transmission/reception by combining a plurality of antennas. For example, different data are simultaneously transmitted through a plurality of antennas and are combined upon reception thereof. The MIMO multiplex 1 and the MIMO multiplex 2 represented in FIG. 10 and FIG. 11 illustrate formats when different data are multiplexed in the same frequency band and are transmitted, and thus, the MIMO multiplex 1 and the MIMO multiplex 2 respectively contain different data. FIG. 9 is a diagram of an example of how to select a format in consideration of whether MIMO is applied, FIG. 10 is a diagram of MIMO multiplexed examples when A/N is not transmitted, and FIG. 11 is a diagram of MIMO multiplexed examples when A/N is transmitted.

As explained above, according to the third embodiment, the selection of format in consideration of application of the MIMO becomes possible, and even if a plurality of antennas are combined to widen the band for data transmission/reception, it is possible to ensure high ACK/NACK determination accuracy without a decrease in the efficiency.

[d] Fourth Embodiment

The embodiments of the present invention have been explained so far, however, the present invention may be implemented in various different modes other than the embodiments.

(1) Modulation Scheme

For example, the first to the third embodiments have exemplified QPSK, 16QAM, and 64QAM, or the like as the modulation schemes, however, any scheme can be adopted if it is a digital modulation scheme used for wireless communication such as OFDM (Orthogonal Frequency-Division Multiplexing).

(2) System Configuration and the Like

The operating procedures, the control procedures, and the information including specific names, various data, and parameters (e.g., FIG. 4) can be arbitrarily changed unless otherwise specified.

According to an aspect of the terminal device and the base station device disclosed in the present application, it is possible to ensure high ACK/NACK determination accuracy without a decrease in efficiency.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal device comprising:
a format deciding unit that decides a transmission format of an uplink data channel to be transmitted to a base station device based on uplink-channel transmission information that is received from the base station device and specifies the transmission format;
a response deciding unit that decides a response content to the base station device when a downlink data channel is received from the base station device, based on a result of decoding the downlink data channel; and
a response transmitter that transmits the response content decided by the response deciding unit to the base station device through the uplink data channel using the transmission format decided by the format deciding unit, wherein
the format deciding unit switches between a first format for overwriting the response content in data and a second format for ensuring an area for the response content indicating whether or not the response is transmitted to the base station device, based on the uplink-channel transmission information.

2. The terminal device according to claim 1, wherein the response deciding unit, when having received the downlink data channel from the base station device, decides a success of reception or a failure of reception as the response content to the base station device based on a result of decoding the downlink data channel, and decides no response as the response content to the base station device when the downlink data channel cannot be received from the base station device.

3. The terminal device according to claim 1, wherein the format deciding unit, when a value of Modulation and Coding Scheme (MCS) indicating a combination of a modulation scheme and a channel code rate included in the uplink-channel transmission information is less than a threshold, decides to use the first format, and decides to use the second format when the value of the MCS is equal to or more than the threshold.

4. The terminal device according to claim 1, wherein the format deciding unit, when a wireless resource allocated to uplink data transmission from the terminal device to the base station device is equal to or higher than a threshold, decides to use the first format.

5. The terminal device according to claim 1, wherein the format deciding unit, when MIMO multiplex is applied to uplink data transmission from the terminal device to the base station device, decides to use the second format.

6. A method of controlling a terminal device, comprising:
first deciding a transmission format of an uplink data channel to be transmitted to a base station device based on uplink-channel transmission information that is received from the base station device and specifies the transmission format;
second deciding a response content to the base station device when a downlink data channel is received from the base station device, based on a result of decoding the downlink data channel; and
transmitting the decided response content to the base station device through the uplink data channel using the decided transmission format, wherein the first deciding includes switching between a first format for overwriting the response content in data and a second format for ensuring an area for the response content indicating whether or not the response is transmitted to the base station device, based on the uplink-channel transmission information.

7. A base station device comprising:
a measuring unit that measures a signal to interference ratio using control signals received from a terminal device through wireless communication;
a deciding unit that decides an uplink-channel transmission information for specifying a transmission format of an uplink data channel to be transmitted to the base station based on the signal to interference ratio measured by the measuring unit;
a transmitter that transmits the uplink-channel transmission information to the terminal device using a control channel including downlink scheduling information;
a response control unit that transmits a downlink data channel to the terminal device, and receives an uplink data channel including a response content indicating a result of receiving the downlink data channel; and
a response specifying unit that specifies a response content from the uplink data channel received by the response control unit in a determination method according to the uplink-channel transmission information decided by the deciding unit, wherein
the response control unit receives a first uplink data channel transmitted by using a first format for overwriting the response content in data or a second uplink data channel transmitted by using a second format for ensuring an area for the response content indicating whether or not the response is transmitted to the base station device, the first format and the second format are switched based on the uplink-channel transmission information; and
the response specifying unit specifies a response content in the determination method using each bit pattern of a response signal in the first uplink data channel indicating a success of reception or of a response signal in the first uplink data channel indicating a failure of reception, or specifies the response content in a determination method using received power in the ensured area in the second uplink data channel, according to the uplink-channel transmission information.

8. The base station device according to claim 7, wherein the response specifying unit, when a Modulation and Coding Scheme (MCS) value indicating a combination of a modulation scheme and a channel code rate included in the uplink-channel transmission information is less than a threshold, specifies a response content in the determination method using each bit pattern of a response signal indicating a success of reception or of a response signal indicating a failure of reception, and when the MCS value included in the uplink-channel transmission information is equal to or more than the threshold, specifies the response content in a determination method using received power in the ensured area.

9. The base station device according to claim 7, wherein the response control unit receives, when a wireless resource allocated to uplink data transmission from the terminal device to the base station device is equal to or higher than a threshold, the first uplink data channel transmitted by using the first format.

10. The base station device according to claim 7, wherein the response control unit receives, when MIMO multiplex is applied to uplink data transmission from the terminal device to the base station device, the second uplink data channel transmitted by using the second format.

* * * * *